INVENTOR
Alan Bedford

United States Patent Office 3,421,317
Patented Jan. 14, 1969

3,421,317
ELECTRICAL CONTROL SYSTEMS FOR ENGINES
Alan Bedford, Hatfield, England, assignor to Hawker Siddeley Dynamics Limited, Hatfield, England, a company of Great Britain
Filed Apr. 5, 1966, Ser. No. 540,280
Claims priority, application Great Britain, Apr. 7, 1965, 14,758/65
U.S. Cl. 60—39.28          20 Claims
Int. Cl. F02c 9/04; F02g 3/02

ABSTRACT OF THE DISCLOSURE

The invention provides a control system for an engine having a rotatable part, the control system including means for deriving a demand signal and for modifying that demand signal to an allowable value, the modified demand signal having a frequency which represents the allowable demanded speed of the rotatable part, means for deriving an actual speed signal having a frequency representing the actual speed of the rotatable part, and means for comparing the modified demand signal and the actual speed signal to obtain an error signal controlling the fuel supply to the engine.

---

This invention is concerned with improvements in or relating to electrical control systems for engines, and relates particularly, but not exclusively, to the control of gas-turbine engines.

In the control of gas-turbine engines it is important to ensure that, during acceleration of the engine, the engine is not accelerated too rapidly. If an attempt is made to accelerate the engine too rapidly, the engine may become supplied with an excess of fuel, resulting in either stalling of the compressor (a condition which arises when the compressor attains an unstable condition, the output air-pressure of the compressor being too high) or in an excessively high flame temperature of the engine (in which case, a part of the engine may become burned out).

An object of the present invention is to provide an improved electrical control system for a gas-turbine engine, the control system being designed not only to control the operation of the engine when it is in a steady state wherein the engine is not being accelerated, but also to so control the engine that it is not accelerated too rapidly.

The invention provides an electrical control system for an engine having a rotatable part and a throttle for controlling the fuel supply to the engine, the control system comprising means for deriving a demand signal which represents a demanded speed of the rotatable part, a modifying circuit including first modifying means for deriving at least one modifying signal as a function of the excess amount by which the value of at least one operating parameter of the engine exceeds a datum value for that parameter, the modifying circuit being arranged to combine the demand signal and the first modifying signal to modify the demand signal in the sense to reduce the excess amount, and to derive a periodic control signal the frequency of which represents the allowable demanded speed of the rotatable part, means for deriving a periodic speed signal the frequency of which represents the actual speed of the rotatable part, a frequency comparison device arranged to receive the control signal and the speed signal and to derive an error signal representing the difference between frequencies of the control signal and the speed signal, and drive means responsive to the error signal to tend to change the fuel supply to the engine in the sense to reduce the error signal.

Examples of engines to which the invention is applicable are diesel engines, steam-turbine engines, and gas-turbine engines.

One embodiment of the invention, and a number of modifications thereof, will now be described by way of example, reference being made to the accompanying drawings in which:

FIGURE 1 is comprised of FIGURES 1A, 1B and 1C and is a block diagram of an electrical control system, according to the invention, for a gas-turbine engine of the two-shaft type having a compressor turbine and a free turbine;

Figure 1A:
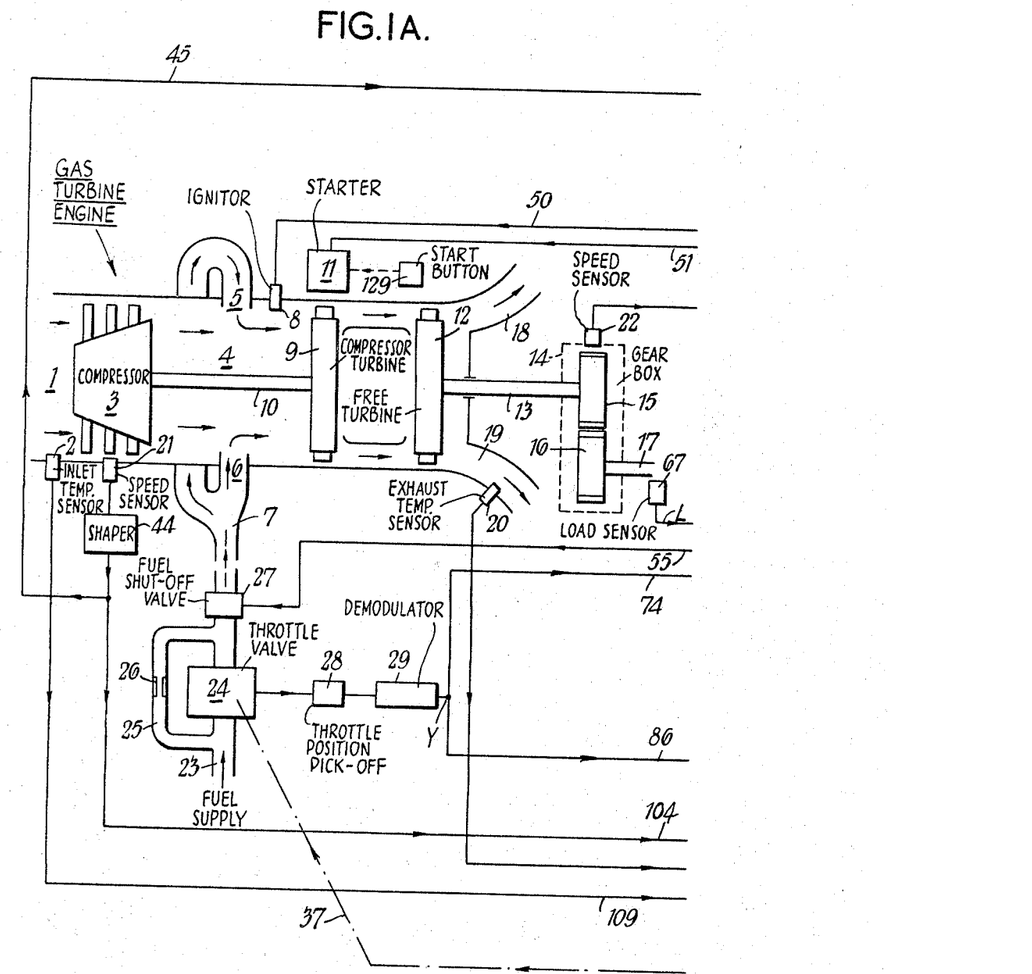
Figure 1B:
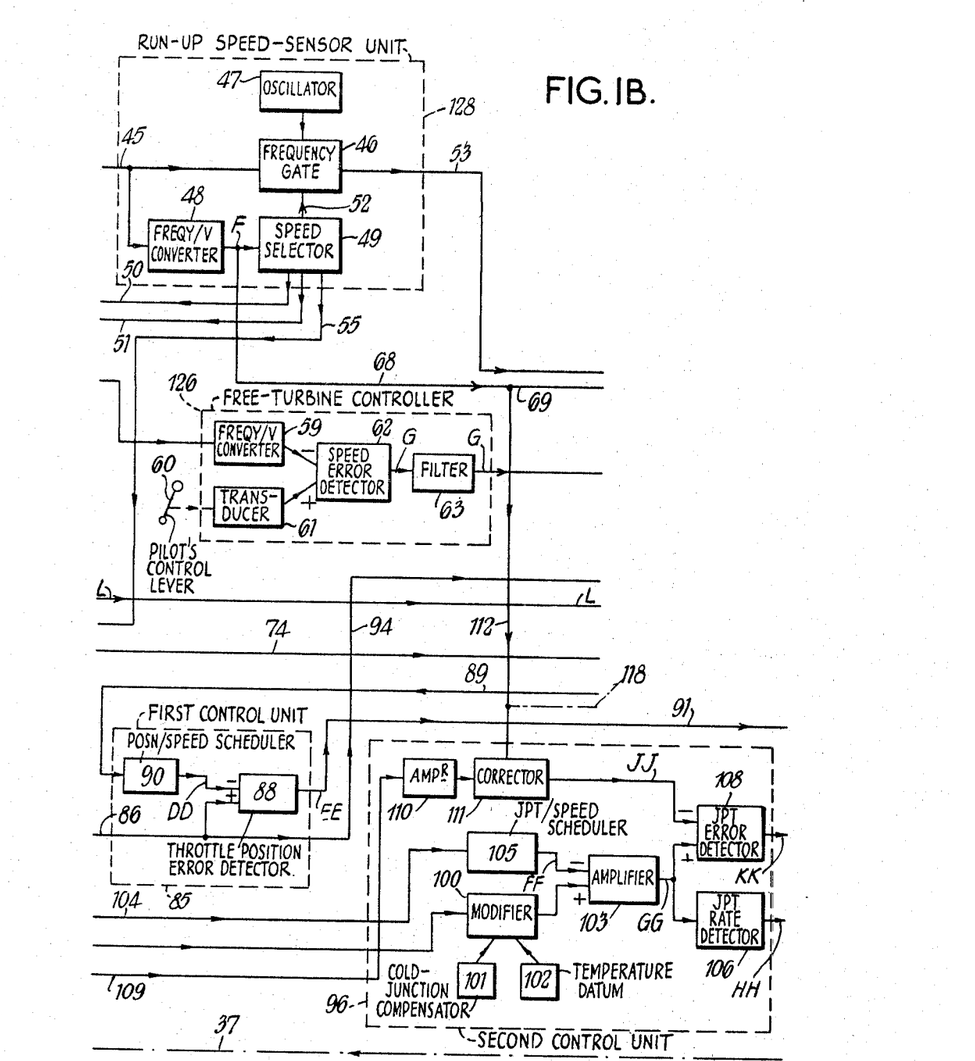

The gas-turbine engine to be controlled is shown diagrammatically in FIGURE 1, and is of conventional form. Atmospheric air enters the engine air-inlet 1, the temperature of the incoming air being sensed by a suitable temperature sensor 2, and is compressed by a compressor 3. The air then passes to a combustion chamber 4, to which fuel is also introduced through fuel inlets 5 and 6 supplied with fuel from a fuel line 7. Combustion takes place in the combustion chamber 4, and may be commenced by an ignitor 8. The combusted air and fuel then passes to a compressor turbine 9 and rotates the compressor turbine, which drives the compressor 3 via a shaft 10. The engine may be started by a starter motor 11.

The combusted air and fuel then pass to, and drive, a power turbine in the form of a free turbine 12 arranged to drive a shaft 13 which is coupled, via a gear box 14 containing meshing gear wheels 15 and 16, to an output shaft 17 which is arranged to drive the load concerned. In typical examples, the load may be the rotor blades of a helicopter which includes the gas-turbine engine, or an electrical generator driven by the gas-turbine engine when located upon the ground.

From the free turbine 12, the combusted air and fuel pass to exhaust pipes 18 and 19, the temperature of the exhaust gases being measured by a temperature sensor 20. For the case of the gas-turbine engine being considered, the temperature of the exhaust gases (as measured by the temperature sensor 20) will be referred to herein as "the jet-pipe temperature."

The speed of the compressor 3 (and hence the speed of the compressor turbine 9) is measured by a speed sensor 21, and the speed of the free turbine 12 is measured by a speed sensor 22 sensitive to the speed of the gear wheel 15.

Fuel from a fuel supply is supplied to a supply line 23 from which the fuel may pass to the engine via a throttle valve 24, the throttle valve 24 being by-passed by a line 25 containing a restriction 26. A fuel shut-off valve 27 may be operated to completely cut off the fuel supply to the engine.

The position (i.e. the opening) of the throttle at any one time is indicated by the output of a throttle-position pick-off 28. The pick-off 28 may be of the type (for example, a synchro) which provides an alternating output voltage of amplitude proportional to the opening of the throttle 24. In such case, this output voltage is supplied to a demodulator 29 of which the output is a direct voltage Y of amplitude proportional to the opening of the throttle 24.

Figure 1C:
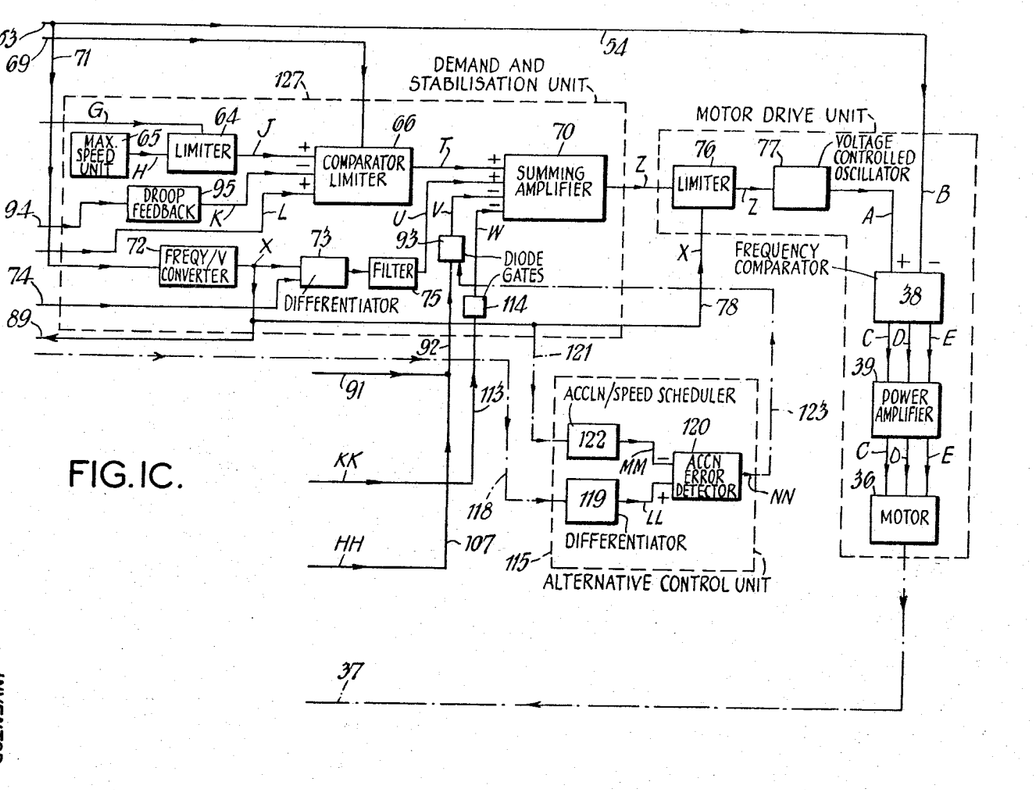

The error signal in the form of a system of varying electric current may be derived, by a suitable frequency comparator such as that, 38, shown in FIGURE 1C, from two repetitive electric signals (hereinafter referred to, for convenience, as "pulse-trains," although such signals need not comprise a train of pulses but may be, for example, waves such as sine-wave).

Two such "pulse-trains" A and B are generated in a manner to be described below and supplied to the frequency comparator 38. The frequency of the pulse-train A represents a desired value of the speed of the compressor turbine 9, while the frequency of the pulse-train B represents (except, as to be described below, during starting of the gas-turbine engine) the actual value of the speed of the compressor turbine 9. The difference between the frequencies of the pulse-trains A and B is thus a measure of the error in the speed of the compressor turbine 9.

The frequency comparator 38 generates the system of varying electric current which comprises a set of three rectangular pulse-trains C, D and E which have a common frequency equal to the difference of the frequencies of the pulse-trains A and B, and which are mutually relatively phase-displaced by 120° in one sense or the other sense according to the sense of the difference of the frequencies of the pulse-trains A and B.

The pulse-trains C, D and E are amplified in an amplifier 39, and are then suitably supplied to the armature windings of an electric motor 36 of the synchronous type, in such a way that the speed of the rotor of the motor 36 tends to be proportional to the frequency of the pulse-trains C, D and E, the rotor rotating in a sense determined by the sense of the mutual relative phase-displacement of the pulse-trains C, D and E. The motor 36 thus acts as an integrator, the position of the rotor of the motor 36 being the integral, with respect to time, of the error signal represented by the pulse-trains C, D and E.

The rotor of the electric motor 36 is arranged, via a suitable mechanical linkage indicated at 37, to open or close the throttle valve 24.

The method of generation of the pulse-train B will now be described. The output of the speed sensor 21 is a periodic voltage, the frequency (and amplitude) of which is proportional to the speed of the compressor turbine 9, and this voltage is passed through a shaping circuit 44 which improves the waveform of the periodic voltage, so as to make it acceptable by the apparatus next to be described. The output of the shaping circuit 44 is supplied, via a line 45, to one input of a frequency gate 46; a second input of the gate 46 is supplied, from a fixed-frequency oscillator 47, with a pulse-train of a frequency corresponding to the highest allowable speed of the compressor turbine, such frequency being determined in accordance with the output of the speed sensor 21.

The output of the shaping circuit 44 also passes, via the line 45, to the input of a frequency-to-voltage converter 48 the output of which is a direct voltage F of amplitude proportional to the input frequency and hence to the speed of the compressor turbine 9.

The output of the converter 48 is supplied to a speed selector circuit 49, where the output is compared with four predetermined direct voltages.

The speed selector circuit 49 is so arranged that when the amplitude of the signal F reaches that of a first predetermined direct voltage, a signal is passed along a line 50 to energise the ignitor 8. Further, when the amplitude of the signal F reaches that of a second predetermined direct voltage, a signal is passed along a line 55 to open the fuel shut-off valve 27. Furthermore, when the amplitude of the signal F reaches that of a third predetermined direct voltage, the signal along the line 50 is disconnected so as to cut off the ignitor 8, and also a signal is passed along a line 51 to cut off the starter motor 11. Finally, when the amplitude of the signal F reaches that of a fourth predetermined direct voltage, a signal is passed along a line 52 to operate the frequency gate 46.

It should be noted that, with some gas-turbine engines, the amplitude of the fourth predetermined direct voltage may be greater than the amplitude of the third predetermined direct voltage, so that the frequency gate 46 is operated after the ignitor 8 has been disconnected and the starter motor 11 cut off. In other cases, the amplitude of the fourth predetermined direct voltage may be less than the amplitude of the third predetermined direct voltage, so that the frequency gate 46 is operated before the ignitor 8 has been disconnected and the starter motor 11 cut off.

The frequency gate 46 is so arranged that, if it does not receive a signal along the line 52, the output of the gate 46 is connected to the output of the fixed-frequency oscillator 47. If, however, the line 52 is energised, then the output of the gate 46 is connected to the line 45. The output of the gate 46 comprises the pulse-train B, and is supplied, via lines 53 and 54, to one of the two inputs of the frequency comparator 38.

In a modification of the arrangement being described, the line 52 is omitted, and the frequency gate 46 has the form of a higher-frequency selector. In this case, the fixed-frequency oscillator 47 supplies, to the gate 46, both the pulse-train referred to above as having a frequency corresponding to the highest allowable speed of the compressor turbine, and also a second pulse-train of a lower frequency, the lower frequency corresponding to that speed of the compressor turbine at which the throttle 24 can be allowed to commence opening. In this case, within the gate 46, the lower frequency just referred to is compared with the frequency of the voltage output of the compressor-turbine speed sensor 21, and, according as the former or the latter frequency is the higher, so the output of the gate 46 (the pulse-train B) comprises the pulse-train from the oscillator 47 which has the frequency corresponding to the highest allowable speed of the compressor turbine, or the output of the speed sensor 21.

The method of generation of the pulse-train A will now be described. The output of the speed sensor 22 is a periodic voltage of the frequency of which is proportional to the speed of the free turbine 12. This is supplied to a frequency-to-voltage converter 59 similar to the converter 48, the output of the converter 59 being a direct voltage the amplitude of which is proportional to the actual speed of the free turbine 12. The desired value of the speed of the free turbine 12 is set by a pilot's or operator's control lever 60 arranged to operate a suitable transducer 61 the output of which is a direct voltage the amplitude of which is proportional to the desired speed of the free turbine 12. The output of the converter 59 is subtracted, in a speed error detector 62, from the output of the transducer 61; the output of the detector 62 is thus a direct voltage G of amplitude proportional to the error in the speed of the free turbine 12.

The direct voltage G is the further error signal referred to above, and is basically used as a demand signal the amplitude of which represents a demanded speed of the compressor turbine 9. Thus, when the gas-turbine engine is in a steady state, the frequency of the pulse-train A is directly proportional to the amplitude of the voltage G. When, however, the gas-turbine engine is being accelerated, the direct voltage G becomes modified by other control signals described below, and in such case the frequency of the pulse-train A (representing an allowable demanded speed of the compressor turbine 9) is a more complicated function of the direct voltage G.

Thus, the signal G is passed, through a filter 63, to one input of a limiter circuit 64, the filter 63 being designed to prevent oscillation of the closed-circuit control loop for the free turbine 12.

The limiter circuit 64 effectively ensures that the amplitude of the signal G does not exceed a predetermined limit. A maximum-speed unit 65 is provided and is arranged to generate a direct voltage H of which the amplitude represents the maximum allowable speed of the compressor turbine 9, the voltage H being supplied to a second input of the limiter circuit 64. Within the limiter circuit 64, the amplitudes of the voltages G and H are compared, and the output of the limiter circuit 64 is arranged to be the smaller of the two voltages G and H and is indicated in FIGURE 1C as J.

The amplitude of the signal J represents a demanded speed of the compressor turbine 9, and the signal J is supplied to one of three inputs of a comparator limiter 66.

Within the comparator limiter 66, the amplitude of the voltage J (modified as described below by the voltages K and L) is effectively compared with the amplitude of the voltage F (which represents the actual speed of the compressor turbine 9), and the comparator limiter 66 acts to ensure that the voltage J (modified as described below) never exceeds the voltage F by more than a predetermined amount.

The other input signals to the comparator limiter 66 are two direct voltages K and L. The signal K will be discussed more fully below but, briefly, it is only present if a so-called "droop" control system is required, the amplitude of the signal K being a function of the position (i.e., opening) of the throttle valve 24. The signal L is only present if the control system is required to respond to the magnitude of the load upon the output shaft 17 of the free turbine 12, the signal L being shown as derived from a load sensor 67; the magnitude of the signal L may be directly proportional to the magnitude of the load upon the output shaft 17: for example, if the output shaft 17 is utilised to drive an electrical alternator (not shown), then the load sensor 67 may be arranged to give a direct output voltage L of amplitude proportional to the electrical power supplied by the alternator to an electrical load.

The comparator limiter 66 is so arranged, that the resultant input signal to it is $(J-K+L)$, i.e. the sum of the signals J and L minus the signal K.

Figure 2:
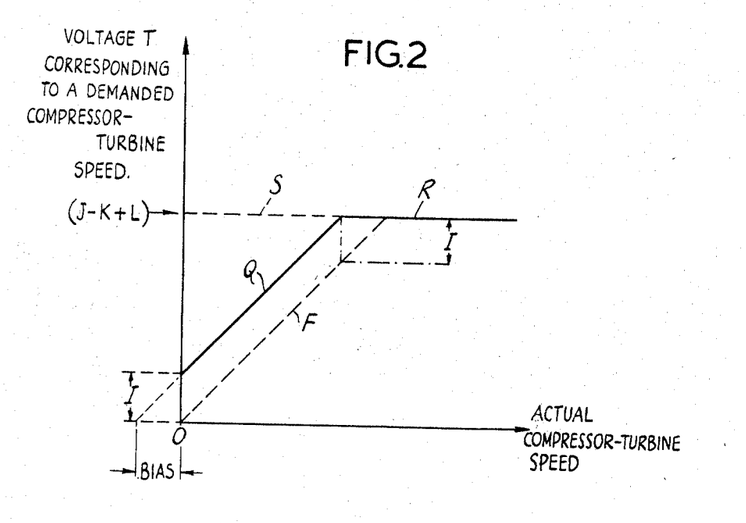
FIGURES 2–7 are graphs illustrating the operation of the control circuit of FIGURE 1.

The output of the comparator limiter 66 is a direct voltage T of which the magnitude represents a speed demanded of the compressor turbine 9, and the action of the comparator limiter 66 is illustrated by FIGURE 2, which is a graph of the voltage T corresponding to a demanded compressor-turbine speed, plotted against the actual speed of the compressor turbine 9. If the comparator limiter 66 did not act to limit its resultant input signal $(J-K+L)$, then the output thereof would be independent of the actual compressor-turbine speed and would be represented by the horizontal straight lines S and R.

However, the comparator limiter 66 is supplied, via lines 68 and 69 (FIGURE 1), with the direct voltage F which is indicated in FIGURE 2 by a broken line.

Within the comparator limiter 66, a circuit is provided to generate a direct voltage Q (represented by the line Q in FIGURE 2) which exceeds the voltage F by a predetermined amount I (see FIGURE 2). The voltage Q represents a compressor-turbine speed which exceeds the actual compressor-turbine speed by a speed-difference represented by the voltage I.

The comparator limiter 66 is so arranged that its output voltage T can never exceed the voltage Q. Thus, if the compressor-turbine speed is initially substantially zero, and if the signal $(J-K+L)$, as shown in FIGURE 2, is applied to the input of the comparator limiter 66, then the output signal T of the limiter 66 is allowed to rise along the curve Q, as the compressor-turbine speed increases, until the voltage Q reaches the value $(J-K+L)$, whereafter the output signal T remains equal to $(J-K+L)$.

Figure 12:
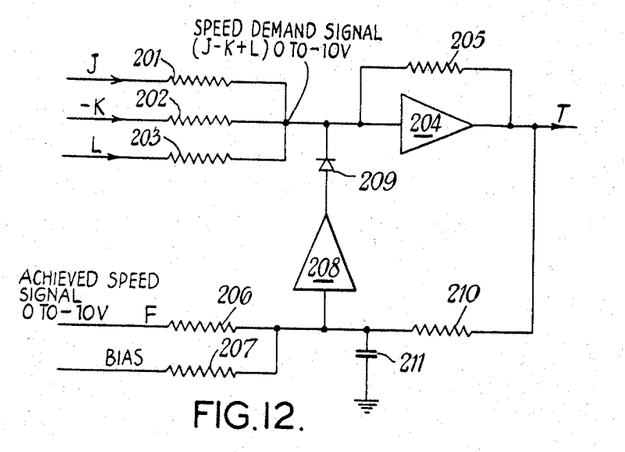
FIGURE 12 illustrates a form of comparator limiter suitable for use in the system shown in FIGURE 1.
Figure 13:
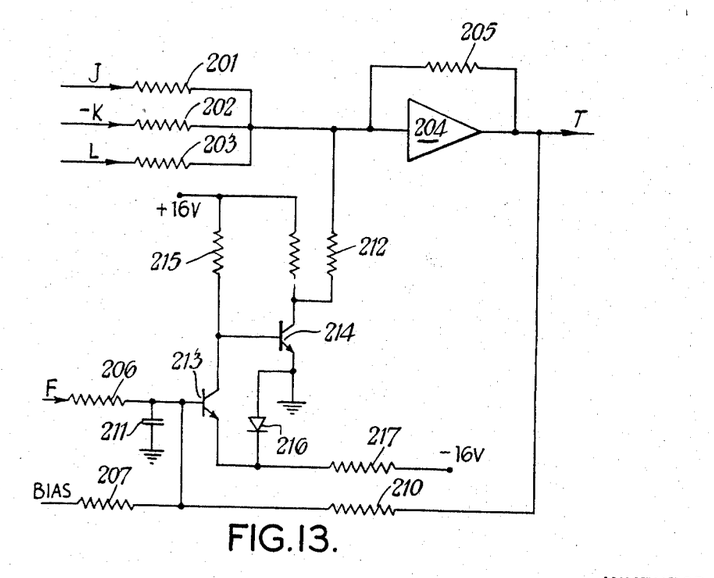
FIGURE 13 illustrates in greater detail a suitable circuit for the comparator limiter of FIGURE 12.

The function of the comparator limiter 66 may be achieved using biased diode circuits. However, the circuit shown in FIGURE 12 and the more detailed form thereof shown in FIGURE 13 are designed to overcome the limitations of conventional circuits due to component tolerances and component drifts caused by fluctuations in temperature.

The input signals J, −K and L are summed by resistors 201, 202 and 203 to provide an input signal of $(J-K+L)$ in the range of 0 to −10 v. to an amplifier 204 which is a low drift, high gain, inverting amplifier, its output being of opposite polarity to its input with a feed-back resistor 205 connected thereacross.

The signal F representing the actual compressor turbine speed is in the range of 0 to −10 v. and is effectively summed with a bias signal by resistors 206 and 207 and applied to the input of a low-drift, high gain, non-inverting amplifier 208 the output of which is of the same polarity as the input thereto. The output of the amplifier 208 is supplied through a diode rectifier 209 to the input of the amplifier 204 so that only output signals of one polarity (in this case positive signals) are applied from the output of the amplifier 208 to the input of the amplifier 204. The output signal T from the amplifier 204 is fed back through a resistor 210 to the input of the amplifier 208 to form a feed-back loop which is coupled to earth by a capacitor 211.

The resistors 201, 202, 203, 205, 206 and 207 are precision resistors of equal value, e.g. $10K \pm 0.1\%$ and effectively control the operation of the circuit. The capacitor 211 restricts the bandwidth of the feedback loop formed by the amplifier 204, resistor 210, amplifier 208 and diode 209 and the value of the capacitor 211 is chosen to ensure stability of this loop.

The operation of the circuit is as follows: A signal of 0 to −10 volts representing the demanded compressor turbine speed of 0 to 100% and being the signal $(J-K+L)$ is applied to the input of the amplifier 204 to produce a corresponding output signal of the same magnitude but of opposite polarity, i.e. in the range of 0 to +10 v. A signal F representing the actual compressor turbine speed (as modified by the bias signal) is applied to the input of the amplifier 208 and has a value of 0 to −10 volts equivalent to 0 to 100% actual speed. Thus, the polarity of the output of the amplifier 208 will depend on the polarity of the inputs thereto, namely, the polarity of the signals F, T and the bias signal. If the achieved speed F is greater than (the demanded speed T less the bias level) the output of the amplifier 208 will be negative and will be blocked by the diode 209. If, however, the achieved compressor turbine speed is lower than (the demanded speed T minus the bias level) the output of the amplifier 208 will be positive and the diode 209 conducts. In this case, due to the high gain of amplifier 208, only a small positive input signal is required to produce an output from the amplifier 208 sufficiently large to reduce the output of the amplifier 204 so that the output thereof becomes very nearly equal to the achieved compressor turbine speed plus the bias level.

In the way the value R (FIGURE 2) is generated by the amplifier 204 and the resistors 201, 202, 203 and 205 with the diode 209 nonconducting, i.e. with the achieved compressor speed sufficiently high. The value Q (FIGURE 2) is generated from the achieved speed when the diode 209 is conducting, i.e. when the achieved speed is lower than (the demanded speed minus the bias level).

FIGURE 13 shows in greater detail a circuit of a suitable low-drift, high gain, non-inverting amplifier which may be used for the amplifier 208 in FIGURE 12. Like reference numerals are used to denote like parts. With this arrangement only positive output signals are generated and the diode 209 may be replaced by the resistor 212. The amplifier has two direct coupled grounded emitter transistor stages respectively embodying transistors 213 and 214, the collector load resistance 215 of the first stage transistor 213 being chosen to ensure that sufficient current can flow into the base of the second stages transistor 214 to saturate the transistor 214. The first stage transistor 213 is of a type which possesses high gain at low collector currents so that if the achieved speed is low only a small current derived from the output of the amplifier 204 via the resistor 210 is required to flow into the base of the transistor 213 to reduce the base current of the transistor 214 and so raise the collector potential of the transistor 214 by the amount required to control the output of the amplifier 204.

The diode 216 and the associated resistor 217 provide the required base emitter voltage bias for the transistor 213 to enable the base of the transistor 213 to operate at substantially zero potential over a wide temperature range and represents an alternative to the use of an expensive dual transistor in the first transistor stage.

The output signal T, representing a modified demand for a compressor-turbine speed, is supplied to one of four inputs of a summing amplifier 70. The summing amplifier 70 has three other input signals: U, V, and W. The signal U is a stabilising signal, to stabilise the closed-loop control circuit for the compressor turbine 9, and is derived as follows: the pulse-train B, discussed above, appearing at the output of the frequency gate 46, is supplied over lines 53 and 71 to the input of a frequency-to-voltage converter 72 similar to the converters 48 and 59, so that the output of the converter 72 is a direct voltage X of amplitude proportional to the frequency of the pulse-train B, and the voltage X being supplied to one input of a differentiator circuit 73. In addition, the output Y of of the demodulator 29, which is a direct voltage of amplitude proportional to the opening of the throttle 28, is supplied, along a line 74, to a second input of the differentiator circuit 73. Within the differentiator circuit 73, the two signals X and Y are summed and differentiated, the output of the differentiator circuit 73 being passed through a filter 75 of which the output constitutes the signal U.

In a modification of the arrangement just discussed, the output voltages X and Y are separately differentiated and filtered and passed to the respective inputs of a summing unit. Within the summing unit, the two signals are added together, and the output of the summing unit constitutes the signal U. This separate differentiation and filtering of the signals X and Y permits higher-order filters to be used.

The signals V and W will be discussed below.

Within the summing amplifier 70, the signals V and W are added together, and subtracted from the sum of the signals T and U, so that the output of the amplifier 70 is a direct voltage Z of amplitude proportional to $(T+U)-(V+W)$.

The voltage Z is passed, through a voltage limiter 76 (discussed below), to the input of a voltage-controlled oscillator 77 of which the output is the pulse-train A of frequency proportional to the amplitude of the voltage Z.

If the frequency of the pulse-train A is much greater than or much less than the frequency of the pulse-train B, the frequency of the rectangular pulse-trains C, D and E may become too great to permit the motor 36 to operate properly. For this reason, the frequency of the pulse-train A must be maintained within a predetermined frequency-difference with respect to the frequency of the pulse-train B. This is done, in the circuit of FIGURE 1, by the voltage limiter 76: the voltage limiter 76 is supplied, along a line 78, with the voltage X of amplitude proportional to the frequency of the pulse-train B, and the voltage limiter 76 acts to ensure that the amplitude of its output signal Z never departs, by more than a predetermined amount, from the amplitude of the signal X, thus producing the required results.

The method of generation of the signal V will now be described, the general purpose of the signal V being to limit the acceleration of the compressor turbine 9 when it is accelerated.

Figure 3:
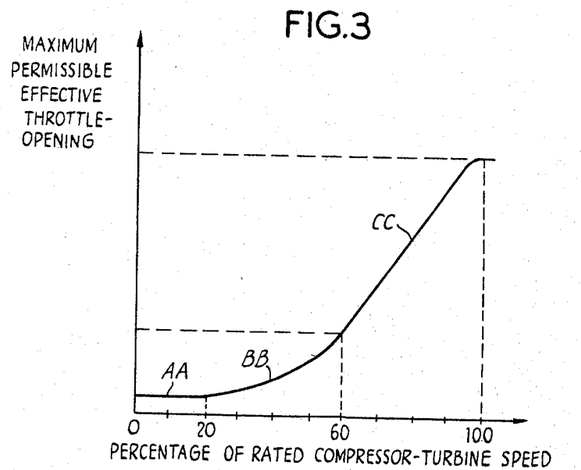

In the control circuit of FIGURE 1, the signal V is arranged to be generated as a function of two critical parameters: the excess amount by which the opening of the throttle valve 24 exceeds a datum value of that opening, and the excess amount by which a function of jet-pipe temperature exceeds a datum value thereof. In fact, it is assumed (for the moment) that the gas-turbine engine concerned is of such a kind that control of the engine is best obtained by generating the signal V as a function of both of those two critical operating parameters. This particular control scheme is illustrated by FIGURE 3, which is a typical schedule for (the maximum permissible effective opening of the throttle valve 24) plotted against (the percentage of the rated, i.e. maximum permissible, speed of the compressor turbine 9). It will be seen that, for actual compressor-turbine speeds within the range of 0–20% of the rated speed of the compressor turbine 9, the throttle opening is required to be held constant, this being represented by the horizontal straight line AA. For actual compressor-turbine speeds within the range of 20–60% of the rated speed of the compressor turbine 9, the throttle is allowed to open increasingly more, but the maximum permissible effective opening at any given compressor-turbine speed is limited as a predetermined function of that speed, the function being represented by the curve BB. For actual compressor-turbine speeds within the range of 60–100% of the rated speed of the compressor turbine 9, the maximum permissible effective opening of the throttle is limited as a function of the jet-pipe temperature and rises, within-crease in speed of the compressor turbine 9, according to a curve of the form CC.

The schedule of FIGURE 3, as described in the preceding paragraph, may be obtained by the use of the apparatus next to be described.

Firstly, the horizontal straight line AA (FIGURE 3) corresponds to the restriction 26 which by-passes the throttle valve 24. For actual compressor-turbine speeds within this range, the throttle valve 24 is held closed by the nonoperation of the frequency gate 46, so that the frequency of the pulse-train B is relatively high and acts to maintain the throttle valve 24 closed.

Secondly, the curve BB (FIGURE 3) is obtained by the first control unit 85 of FIGURE 1. The voltage Y at the output of the demodulator 29 is supplied, over a line 86, to one input of a throttle-position error detector 88. Further, the voltage X at the output of the converter 72, is supplied over a line 89 to a throttle-position/speed scheduler 90. The scheduler 90 may comprise an arrangement of resistors and diode rectifiers arranged to generate, from the voltage X, a direct output voltage DD the amplitude of which is a predetermined function of the actual or apparent speed (as represented by the voltage X) of the compressor turbine 9, the voltage DD corresponding to the curve BB (FIGURE 3) and representing (to the same scale as the output Y of the demodulator 29) a datum value of the opening of the throttle valve 24 at the existing or apparent speed of the compressor turbine 9.

Figure 4:
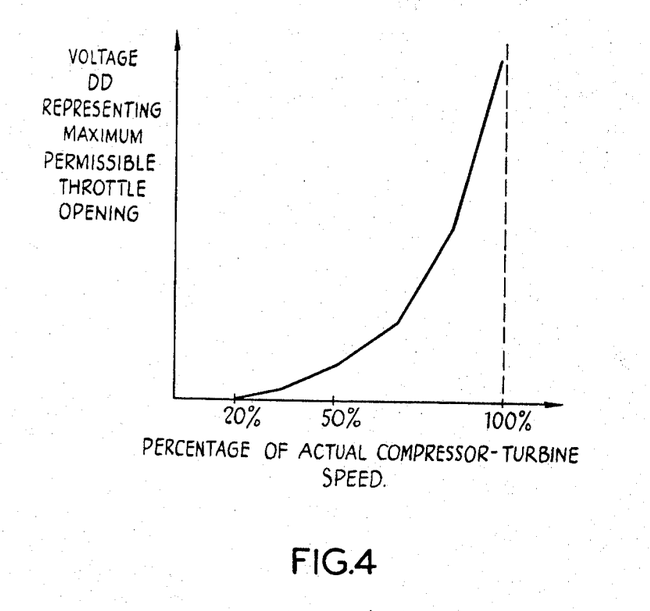

The voltage DD may have the form of FIGURE 4, which is a graph of the voltage DD plotted against the actual speed of the compressor turbine 9, the curve of the voltage DD being made up of a plurality of (as shown, five) linear sections of increasing slope.

The voltage DD is supplied to the second input of the throttle-position error detector 88, where it is subtracted from the output Y of the demodulator 29 to derive an error signal EE which is supplied, over lines 91 and 92, to the input of a diode gate 93. If the actual opening of the throttle valve 24 is less than the datum opening represented by the voltage DD, the error signal EE will be of negative polarity and will not be passed by the diode gate 93, and the output of the diode gate 93 (the signal V) will be zero. If, however, the actual opening of the throttle valve 24 exceeds the datum opening represented by the voltage DD, then the error signal EE will be of a positive polarity and will be passed by the diode gate 93 and will constitute the input signal V to the amplifier 70, the effect of the signal V being to tend to close the throttle valve 24.

The output Y of the demodulator 29, representing the actual opening of the throttle 24, may be used (if required) to convert the control system to a "droop" control system. In such case, the output of the demodulator 29 is supplied, over the lines 86 and 94, to a droop feedback unit 95 comprising a scaling potentiometer, the output of the unit 95 constituting the signal K referred to above. The effect of the signal K will be to tend to close the throttle valve 24.

Thirdly, the curve CC of FIGURE 3 is obtained by the second control unit 96 of FIGURE 1. The output of the exhaust-temperature sensor 20, a direct voltage of which the amplitude is a function of the jet-pipe temperature, is supplied to a modifying unit 100 wherein the direct voltage just referred to is modified by the output of a cold-junction-compensating circuit 101, and is also modified by the output of a temperature-datum circuit 102, both of the circuits 101 and 102 being of commonly known form. The output of the modifying unit 100, a direct voltage of which the amplitude is a function of the jet-pipe temperature, is supplied to one input of a high-gain amplifier 103. In addition, the output of the shaping circuit 44, a periodic voltage of which both the frequency and the amplitude are proportional to the actual speed of the compressor turbine 9, is supplied over a line 104 to the input of a jet-pipe-temperature/speed scheduler 105. The scheduler 105 is arranged to generate, from the periodic voltage just referred to, a direct output voltage FF the amplitude of which is a predetermined function of the actual speed of the compressor turbine 9, and represents, to the same scale as the output of the modifying unit 100, a datum jet-pipe temperature at the existing speed of the compressor turbine 9.

The voltage FF is supplied to the second input of the amplifier 103. Within the amplifier 103, the voltage FF is substracted from the output of the modifying unit 100 to derive an error signal GG. The error signal GG is supplied to a jet-pipe-temperature rate detector unit 106, of which the output is a signal HH which is a function both of the error signal GG and of the rate of change, with time, of the error signal GG. The signal HH is supplied, over lines 107 and 92, to the input of the diode gate 93. Broadly speaking, if the actual jet-pipe temperature is less than the datum value represented by the voltage FF, then the signals GG and HH will be of a negative polarity and the signal HH will not be passed by the diode gate 93, and the output of the diode gate 93 (the signal V) will be zero (unless the gate 93 is passing the signal EE described above and derived from the first control unit 85). If, however, the actual jet-pipe temperature exceeds the datum value represented by the voltage FF, then the signals GG and HH will be of a positive polarity, in which case the signal HH will be passed by the diode gate 93 and will constitute, or form a part of, the input signal V to the amplifier 70, the effect of the signal V being to tend to close the throttle 24.

The first and second control units 85 and 96 are so arranged, in conjunction with the diode gate 93, that there is a smooth transition between the curves BB and CC of FIGURE 3, i.e. between the two different control regions of the units 85 and 96.

One of the control units 85 and 96 (FIGURE 1) may be omitted, so that the signal V is, over the whole range of compressor-turbine speeds at which it is effective, either a function of the excess amount by which the actual opening of the throttle valve 24 exceeds a datum value thereof, or a function of the excess amount by which a function of the jet-pipe temperature exceeds a datum value thereof.

The method of generation of the signal W will now be described, the signal W is a "top-temperature limiting" signal and is effective only when the error in the jet-pipe temperature exceeds a datum value which is a predetermined function both of the air-inlet temperature and of the speed of the compressor turbine 9.

Thus, the error signal GG which is an algebraic measure of the amount by which a function of the jet-pipe temperature exceeds a datum temperature corresponding to the output of the scheduler 105, is supplied to one input of a jet-pipe-temperature error detector 108. The output of the inlet air-temperature sensor 2, a direct voltage which is a function of the temperature of the air entering the air inlet 1 of the engine, is supplied by a line 109 to an amplifier 110, the output of which is supplied to a corrector unit 111 which is also supplied, via lines 68 and 112, with the direct voltage F of which the amplitude is proportional to the actual speed of the compressor turbine 9.

The corrector unit 111 comprises an electrical circuit arranged to derive, from the output of the amplifier 110 and the signal F, a direct voltage JJ the amplitude of which represents, for the existing inlet-air temperature and the existing compressor-turbine speed, a datum value of the error signal GG. The voltage JJ is supplied to the other input of the jet-pipe-temperature error detector 108.

Within the error detector 108, the voltage JJ is subtracted from the error signal GG to derive an error signal KK which is supplied, over a line 113, to the input of a diode gate 114. If the error in the jet-pipe temperature is less than the datum represented by the amplitude of the voltage JJ, then the error signal KK will be of a negative polarity and will not be passed by the diode gate 114, so that the output of the diode gate 114 (the signal W) will be zero. If, however, the error in the jet-pipe temperature exceeds the datum represented by the amplitude of the voltage JJ, then the error signal KK will be of a positive polarity and will be passed by the diode gate 114 to constitute the input signal W to the amplifier 70, the effect of the signal W being to tend to close the throttle 24.

The "top-temperature-limiting" signal W is preferably always provided, whatever form the generation of the acceleration-limiting signal V may take.

In a modification of the arrangement, just described, for generating the signal KK, the direct voltage JJ (representing a datum value for the jet-pipe-temperature error signal GG) may be arranged to be automatically reduced if it is exceeded, by the error signal GG, for more than a predetermined time. In such case, the signal KK will be supplied to a suitable form of integrating circuit (not shown) the output of which is supplied to the corrector unit 111 and arranged to reduce the voltage JJ as required.

In a further modification of the control circuit of FIGURE 1, the critical operating parameter which is concerned in the generation of the signal V, is the acceleration of the compressor turbine 9. Such an arrangement may be found to be suitable for certain forms of gas-turbine engines. In the arrangement according to this modification, the first control unit 85 is omitted, so that no signal EE is passed by it, along the lines 91 and 92 to the diode gate 93. Also, part of the second control unit 96 is omitted, in that the rate detector 106 is omitted, so that no signal HH is passed to the diode gate 93. Instead, an alternative control unit 115 (FIGURE 1) is employed to supply a signal to the diode gate 93.

In the modified arrangement, the output of the diode gate 93 (the signal V) is an acceleration limiting signal which comes into operation only when the actual acceleration of the engine exceeds a datum acceleration which depends upon the actual speed of the compressor turbine 9. Thus, the direct voltage F (proportional to the actual speed of the compressor turbine 9) is supplied over the lines 68, 112 and 118 to a differentiating circuit 119 of which the output is a signal LL representing the actual acceleration of the compressor turbine 9, the signal LL being supplied to one input of an acceleration error-detector circuit 120. Also, the direct voltage X (proportional to the frequency of the pulse-train B) is supplied, from the output of the converter 72 and over a line 121, to the input of an acceleration/speed scheduler 122. The scheduler 122 may be of similar form to the scheduler 90 described above, and is arranged to generate, from the voltage X, a direct output voltage MM the amplitude of which is a predetermined function of the actual or apparent speed (as represented by the voltage X) of the compressor turbine 9, the voltage MM representing (to the same scale as the signal LL) a datum acceleration of the compressor turbine 9 at the existing or apparent speed of that compressor turbine.

The voltage MM is supplied to the second input of the acceleration error detector 120, where it is subtracted from the signal LL to derive an error signal NN which is supplied, over a line 123, to the input of the diode gate 93. If the actual acceleration of the compressor turbine 9 is less than the datum acceleration represented by the voltage MM, then the error signal NN will be of a negative polarity and will not be passed by the diode gate 93, and the output of the diode gate 93 (the signal V) will be zero. If, however, the actual acceleration of the compressor turbine 9 exceeds the datum acceleration represented by the voltage MM, then the error signal MM will be of a positive polarity and will be passed by the diode gate 93 and will constitute the input signal V to the amplifier 70, the effect of the signal V being to tend to close the throttle 24.

The operation of the control circuit will now be described, it being assumed for convenience that the gas-turbine engine is mounted within an aircraft and arranged to drive a propeller of that aircraft.

GENERAL

In a gas-turbine engine of the two-shaft type as shown in FIGURE 1 and having a compressor turbine and a free turbine, the speed of the free turbine is determined first, by the gas flow past its blades, i.e. by the speed of the compressor turbine, and, secondly by the load applied to the free turbine.

It has been found that the speed of the free turbine can be controlled by controlling the speed of the compressor turbine in accordance with the error in the speed of the free turbine. Thus, in the control circuit of FIGURE 1, the actual speed of the free turbine 12 is compared with the desired speed thereof (set by the pilot's or operator's control lever 60), to generate the further error signal G. The signal G, or a modified form of the signal G obtained by various circuit elements, constitutes a demand signal representing an allowable demanded speed of the compressor turbine 9. (It should be noted that the desired free-turbine speed, as set by the control lever 60, is never achieved, in the control circuit of FIGURE 1, so that, when the gas turbine engine is in a steady state, the further error signal G reaches a constant value which is not zero).

START-UP OF THE ENGINE

Suppose the gas-turbine engine is initially stationary and cold, that the pilot's or operator's control lever 60 is in its minimum (engine cut-off) position, and that the control circuit of FIGURE 1 is switched on.

Under these conditions, the output of the frequency gate 46 (the pulse-train B) will be the output of the oscillator 47. This pulse-train B will be supplied to the frequency comparator 38.

During start-up, the signals K, L, U, V and W will be substantially ineffective, so that the amplitude of the signal Z supplied to the input of the limiter 76 will be substantially proportional to the amplitude of the further error signal G. The signal G will either be zero (while the free turbine 12 is stationary and while the control lever 60 remains in its minimum position) or, if the control lever 60 is advanced, during start-up, to an idling position, then the signal G will represent a demanded compressor-turbine speed; in any case, the amplitude of the resulting signal Z, at the input of the limiter 76, will represent a demanded compressor-turbine speed which will be less than the maximum permissible compressor-turbine speed corresponding to the frequency of the pulse-train B. The limiter 76 then acts, as described above, to compare the signal Z with the signal X, and will ensure that the output of the limiter 76 is not more than a predetermined amount less than the signal X. During starting of the engine and until the compressor-turbine 9 reaches that speed at which the frequency gate 46 operates to make the frequency of the pulse-train B dependent upon the speed of the compressor turbine, the throttle valve 24 will be maintained closed, according to the straight line AA of FIGURE 3.

In order to start the engine, the start button 129 is depressed, whereupon the starter motor 11 will rotate until it is disconnected. The starter motor will rotate the compressor-turbine 9 and the compressor 3, and air will be drawn from the inlet 1 to the combustion chamber 4. No fuel is supplied to the combustion chamber 4 at this time, since the fuel shut-off valve 27 is closed.

At a first predetermined compressor-turbine speed the speed selector 49 will operate to energise the ignitor 8 (via the line 50).

At a second, and higher, predetermined compressor-turbine speed the speed selector 49 will operate to open the fuel shut-off valve 27 (via the line 55) thus permitting fuel to pass to the engine via the bypass restriction 26. Thereafter, combustion will commence in the combustion chamber 4.

At a further predetermined compressor-turbine speed at which the compressor-turbine can be made self-sustaining the speed selector 49 will operate to de-energise the starter motor 11 and to disconnect the ignitor 8.

Further, when the compressor-turbine speed reaches a value (corresponding to the end of the region AA of FIGURE 3) at which the throttle valve 24 may be allowed to open the speed selector 49 will operate the frequency gate 46, so that the pulse-train B is thereafter constituted by the output of the speed sensor 21.

RUN-UP OF THE ENGINE

Assume that, at this stage, the gas-turbine engine is in a steady state in which the compressor turbine 9 has become self-sustaining, but the free turbine 12 is substantially stationary. It is now required to accelerate the engine to an idling state, a further steady state of the engine, in which the free turbine is rotating relatively quickly but has no useful load supplied to it; for this purpose, the control lever 60 is advanced to a setting which represents the desired free-turbine speed, whereupon the compressor turbine 9 will become accelerated and, in turn, will accelerate the free turbine 12 to a speed slightly less than the desired speed.

In order that the free turbine 12 may supply useful output torque to a load the compressor turbine must be further accelerated, and this is done either by again advancing the control lever 60 to demand a suitable operating speed for the free turbine 12 when coupled to the load, or by merely applying a load to the free turbine 12.

STEADY-STATE CONDITIONS OF THE ENGINE

It will be clear that, in a steady state of the gas-turbine engine, the actual speed of the compressor turbine 9 will be equal to the desired speed of the compressor turbine, this desired speed being represented by the frequency of the pulse-train A.

It will furthermore be clear that, in such a steady state of the gas-turbine engine, since the frequency of the pulse-train A is not zero, the amplitude of the signal G will not be zero. In other words, the demanded speed of the free turbine 12 (as set by the control lever 60) is never achieved, i.e. the actual speed of the free turbine 12 will always, in a steady state of the gas-turbine engine, be somewhat less than the demanded speed of the free turbine.

Figure 5:
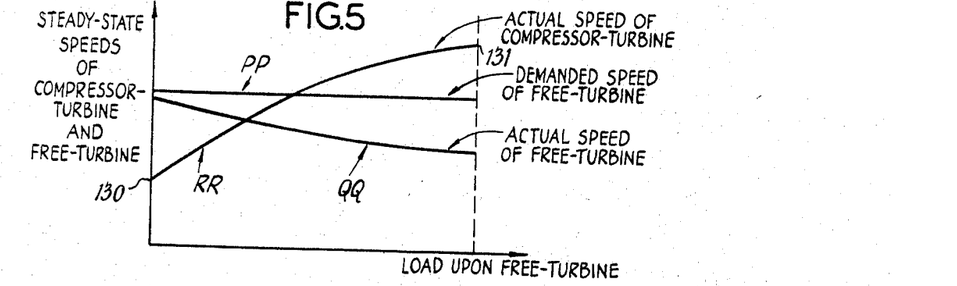

FIGURE 5 is a graph of the steady-state speeds of the compressor turbine 9 and of the free turbine 12, plotted against the load upon the free turbine 12. It is assumed that the demanded speed of the free turbine 12 (as set by the control lever 60) is constant and is represented by the horizontal straight line PP. The curve QQ represents the achieved actual speed of the free turbine 12, under steady-state conditions, and it will be seen that this speed is always less than the demanded speed of the free turbine 12, and is increasingly less than that demanded speed, the greater is the steady load upon the free turbine 12. The curve RR represents the steady-state speed of the compressor turbine 9 which is necessary to maintain the free turbine 12 at a constant speed, and it will be seen that this steady-state speed becomes increasingly great, for increasingly large loads upon the free turbine 12. In FIGURE 5, the point 130 represents the idling speed of the compressor turbine 9, where the load upon the free turbine 12 is negligible, and the point 131 represents the maximum allowable speed of the compressor turbine 9, which speed determines the maximum load which the free turbine 12 can support.

ACCELERATION OF THE ENGINE

Suppose that the gas-turbine engine is initially in a steady-state condition as described above, and that a demand is then made for an increased speed of the free turbine 12.

The amplitude of the direct-voltage further error signal G will increase, demanding a higher compressor-turbine speed.

Firstly, it is possible that the amplitude of the signal G becomes so large that it corresponds to a desired compressor-turbine speed which is greater than the maximum permissible compressor-turbine speed. In such case, the limiter 64 will act to limit the amplitude of the signal G to an amplitude corresponding to the maximum permissible compressor-turbine speed. Thus, the amplitude of the direct-voltage signal J, at the output of the limiter 64, will never be so large that it corresponds to an unacceptably high demanded compressor-turbine speed.

As described above, the effective input to the comparator limiter 66 is the signal $(J-K+L)$. If a "droop" system is not employed, the signal K will be zero. The signal L will only be present, if the control system is required to respond relatively rapidly to changes of load upon the free turbine 12, and will otherwise be zero; if the signal L is present, it will tend to open the throttle valve 24 in response to an increase in the load upon the free turbine 12.

The increase in amplitude of the signal G will thus result in an increase in amplitude of the signal J and thus of the signal $(J-K+L)$ and, as described above with reference to FIGURE 2, the comparator limiter 66 acts to limit this increase of the signal $(J-K+L)$, by reference to the actual speed of the compressor turbine 9. The output signal T from the comparator limiter 66 thus rises steadily (along the curve Q of FIGURE 2), as the actual speed of the compressor turbine rises, until, finally, the signal T becomes equal to $(J-K+L)$.

The signal T is supplied to the summing amplifier 70, where it is added to the stabilising signal U, to form a signal $(T+U)$. The general effect of this signal will be to tend to accelerate the gas-turbine engine and, as a result, one or more critical operating parameters of the engine may exceed predetermined datum values of those parameters. In particular, the opening of the throttle valve 24 may become too great, having regard to the existing speed of the compressor turbine 9. Alternatively, or in addition, a function of the jet-pipe temperature of the engine may become too great, having regard to the existing speed of the compressor turbine 9. Alternatively, the acceleration of the compressor turbine 9 may become too great, having regard to the existing speed of the compressor turbine 9. If any of these situations arises, then the signal V will be generated from one or more of the control units 85, 96 and 115 described above.

In addition, during acceleration of the engine, the "top-temperature limiting" signal W may be present, if the error in the jet-pipe temperature exceeds the predetermined datum (which datum is a function of the inlet-air temperature and of the existing compressor-turbine speed).

As described above, the summing amplifier 70 acts to derive a direct voltage Z which is equal to $$(T+U)-(V+W)$$

thereby reducing the demanded value of the compressor-turbine speed, and so limiting the acceleration of the compressor-turbine to an acceptable value.

As described above, the limiter 76 only comes into operation if the amplitude of the direct voltage Z is such that the frequency of the pulse-train A tends to depart too much from the frequency of the pulse-train B. The limiter 76 is thus normally inoperative.

The oscillator 77 thus normally generates the pulse-train A, of which the frequency is proportional to the amplitude of the signal Z, this frequency representing the desired speed of the compressor-turbine 9.

When the engine is being accelerated, the frequency of the pulse-train A will exceed the frequency of the pulse-train B by an amount which represents the error in the speed of the compressor-turbine 9. Thus, as described in detail above, the frequency comparator 38 will act to generate a corresponding error signal (in the form of the pulse-trains C, D and E), and this error signal will be integrated by the motor 36, the integrated error signal acting to open the throttle valve 24 and thus accelerate the compressor turbine 9.

Figure 6:
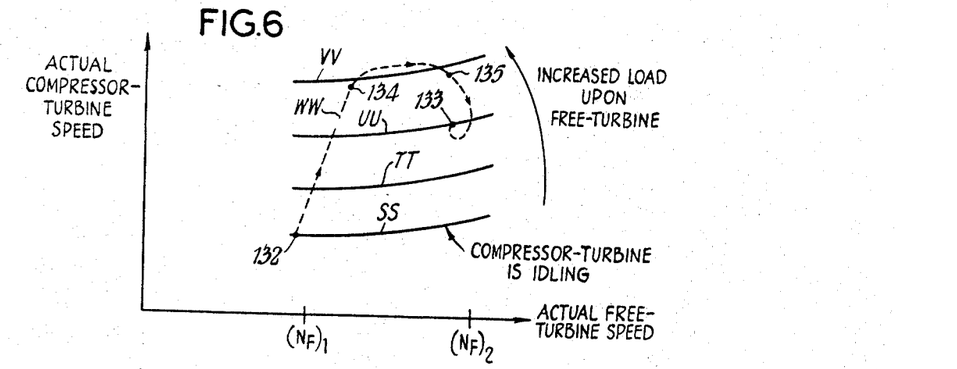

The manner in which a typical gas-turbine engine becomes accelerated when the control lever 60 is advanced, to demand a higher free-turbine speed, is illustrated by FIGURE 6, which is a graph of actual compressor-turbine speed plotted against actual free-turbine speed. Each point upon FIGURE 6 represents a given operating condition of the engine, where the actual compressor-turbine and free-turbine speeds have respective values corresponding to the position of that point.

In FIGURE 6, the curves SS, TT, UU and VV represent steady-state conditions of the gas-turbine engine, each curve showing the relationship, for a given constant load upon the free-turbine 12, of the actual compressor-turbine and free-turbine speeds. The lowest curve, SS, corresponds to idling conditions of the compressor-turbine 9, where the load upon the free turbine 12 is negligibly small. If the load upon the free turbine 12 is increased to a first value, then steady-state operation occurs according to the higher curve TT. If the load is further increased, then steady-state operation occurs according to the still higher curve UU, and so on.

Suppose that the compressor-turbine 9 is initially idling, that the demanded free-turbine speed is $(N_F)_1$, and that thet corresponding state of the engine is represented by the point 132 (FIGURE 6). It will be noted that, at the point 132, the actual free-turbine speed will (as discussed above) be somewhat less than $(N_F)_1$. Suppose that the load upon the free-turbine is then increased to a value corresponding to the curve UU, and that the control lever 60 is simultaneously advanced, to demand a higher free-turbine speed $(N_F)_2$. As mentioned above, the free-turbine will never achieve this desired speed, but can only achieve a somewhat lower speed corresponding to the point 133, which represents the final steady-state of the engine.

It is found that the typical gas-turbine engine accelerates, from the point 132 to the point 133, over an acceleration curve of the form of the broken-line curve WW.

The curve WW may be roughly divided into three parts, by the points 134 and 135, as follows:

(i) The engine first moves from the initial steady state represented by the point 132, to the point 134. During this initial period, the compressor-turbine 9 is strongly accelerated to a high speed approaching its maximum permissible speed, a large error signal being passed to the integrating motor 36 to open the throttle valve 24 increasingly.

The speed of the free-turbine 12, however, initially increases only relatively slowly. It is very important, during such acceleration of the compressor-turbine 9, to avoid supplying excess fuel to the engine, and the acceleration is accordingly limited by the control circuit of FIGURE 1.

(ii) The engine thereafter moves from the state represented by the point 134 to the state represented by the point 135. During this interval, the compressor-turbine speed remains substantially constant, at a value near to its maximum permissible value, while the free-turbine is accelerated, its speed increasing steadily. During this period, the most important feature is that the limiter 64 will act to limit the amplitude of the signal G, so preventing a compressor-turbine speed being demanded, which exceeds the maximum permissible compressor-turbine speed.

(iii) The engine thereafter moves from the state represented by the point 135 to the state represented by the final steady-state point 133. This interval is characterised, in that the error in the speed of the free-turbine 12 is relatively small, so that the amplitude of the signal G is relatively small and the limiter 64 will not be required to operate. Further, the compressor-turbine 12 is no longer being accelerated, so the critical operating parameters of the engine will not exceed their datum values, and the acceleration-limiting signal V will not be present. The signal W will also be absent. During this interval, the engine thus operates substantially as described above under the heading STEADY-STATE CONDITIONS OF THE ENGINE. It should be noted that it is during this interval that problems of instability of the control circuit are particularly encountered, and the control circuit of FIGURE 1 is so designed that it tends to remain stable under these conditions.

Figure 7:
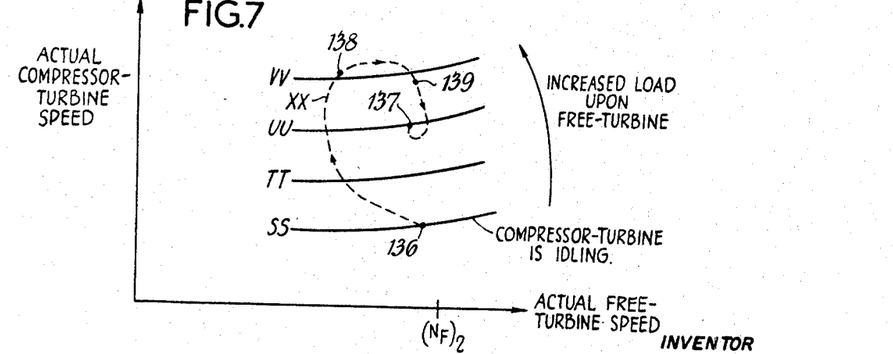

The manner in which a typical gas-turbine engine becomes accelerated when the load upon the free-turbine 12 is increased, is illustrated by FIGURE 7, which is substantially similar to FIGURE 6.

Suppose that the demanded free-turbine speed (as set by the control lever 60) is $(N_F)_2$, and that the compressor-turbine is initially idling, the initial steady-state of the engine being thus represented by the point 136. Suppose that the load upon the free-turbine 12 is then increased to a value corresponding to the curve UU, the position of the control lever 60 remaining constant. The final steady-state of the engine will then be represented by the point 137.

It is found that the typical gas-turbine engine accelerates from the point 136 to the point 137, over an acceleration curve of the form of the broken-line curve XX (FIGURE 7). As in the case of FIGURE 6, the curve XX may be roughly divided into three parts, by the point 138 and 139. Within these three parts of the curve XX, the operating conditions of the engine are respectively similar to those described for the corresponding three parts of the curve WW of FIGURE 6, except, notably, that in the case of the curve XX it will be seen that the increase of the load results in an initial decrease of the free-turbine speed, over the first part of the curve XX.

DECELERATION OF THE ENGINE

The control circuit of FIGURE 1 is designed to restrict the acceleration of the gas-turbine engine, but not to restrict the deceleration of the engine.

Thus, during deceleration of the engine, the limiter 64 and the comparator limiter 66 will be inoperative, and the signals V and W will be zero. The limiter 76 may become operative, however, to ensure (by limiting the amount by which the frequency of the pulse-train A can fall below the frequency of the pulse-train B) that the motor 36 continues to operate correctly.

Thus, when the engine is being decelerated, it will be controlled substantially in the same way as described above under the heading STEADY-STATE CONDITIONS OF THE ENGINE.

MODIFICATIONS OF THE ARRANGEMENT OF FIGURE 1

Modification 1.—Deceleration of the engine

Figure 8:
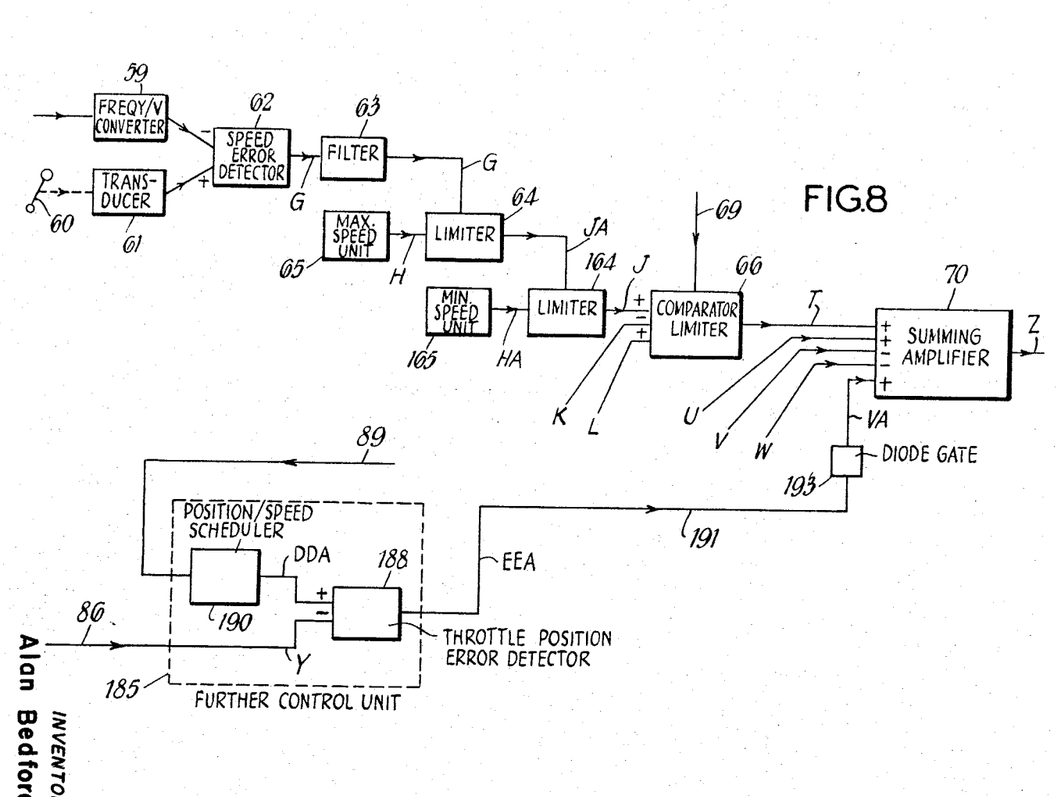
FIGURES 8–11 illustrate modifications of the control system of FIGURE 1.

In a modification of the control circuit of FIGURE 1, the modification being illustrated by FIGURE 8, arrangements are made to restrict the deceleration of the gas-turbine engine.

FIGURE 8 shows the modified portion of FIGURE 1, and circuit elements which are identical to those described with reference to FIGURE 1 are indicated by the same reference numerals.

The arrangement of FIGURE 8 differs from that of FIGURE 1, firstly, in that a further limiter circuit 164 is introduced between the limiter circuit 64 and the comparator limiter 66. The output voltage signal (shown in FIGURE 8 as JA) from the limiter circuit 64 is supplied to the further limiter circuit 164, and the circuit 164 acts to ensure that the effective amplitude of the signal JA never falls below a predetermined limit corresponding to a minimum allowable speed of the compressor turbine 9. Thus, a minimum-speed unit 165 is provided and is arranged to generate a direct voltage HA of which the amplitude represents the minimum allowable speed of the compressor turbine 9, the voltage HA being supplied to a second input of the limiter circuit 164. Within the limiter circuit 164, the amplitudes of the voltages JA and HA are compared, and the output of the limiter circuit 164 is arranged to be the larger of the two voltages JA and HA and is indicated in FIGURE 8 as the signal J which, as described with reference to FIGURE 1, is supplied to the comparator limiter 66.

The arrangement of FIGURE 8 differs from that of FIGURE 1, secondly, in that a further input signal VA can be supplied to the input of the summing amplifier 70, the resultant input signal to the amplifier 70 being then arranged to be $(T+U)-(V+W)+VA$. The signal VA, when present, will be of a positive polarity, so that the effect of the signal VA will be to tend to open the throttle valve 24. The signal VA is arranged to be present when the actual opening of the throttle valve 24 is less than a predetermined datum opening (which datum opening is determined as a function of the existing compressor-turbine speed), and the signal VA is generated as follows.

A further control unit 185 of generally similar form to the control unit 85 (FIGURE 1) is provided. The voltage Y proportional to the actual opening of the throttle valve 24 is supplied, over the line 86, to one input of a further throttle-position error detector 188. Further, the voltage X proportional to the frequency of the pulse-train B is supplied, over the line 89, to a further throttle-position/speed scheduler 190 generally similar to the scheduler 90 (FIGURE 1). The scheduler 190 acts, similarly to the scheduler 90, to generate a direct voltage DDA which represents, as a function of the existing compressor-turbine speed, a datum value of the opening of the throttle valve 24.

The voltage DDA is supplied to the second input of the further throttle-position error detector 188 wherein the voltage Y is subtracted from the voltage DDA to derive an error signal EEA which is supplied, over a line 191, to the input of a diode gate 193. If the actual opening of the throttle valve 24 is greater than the datum opening represented by the voltage DDA, then the error signal EEA will be of a negative polarity and will not be passed by the diode gate 193, and the output of the diode gate 193 (the signal VA) will be zero. If, however, the actual opening of the throttle valve 24 is less than the datum opening represented by the voltage DDA, then the error signal EEA will be of a positive polarity and will be passed by the diode gate 193 and will constitute the input signal VA to the amplifier 70, the effect of the signal VA being to tend to open the throttle valve 24.

The purpose of the signal VA is to tend to prevent "flame-out" (i.e., extinguishing of the flame in the combustion chamber 4), during deceleration of the engine.

*Modification 2.—Derivation of the further error signal G*

Figure 9:
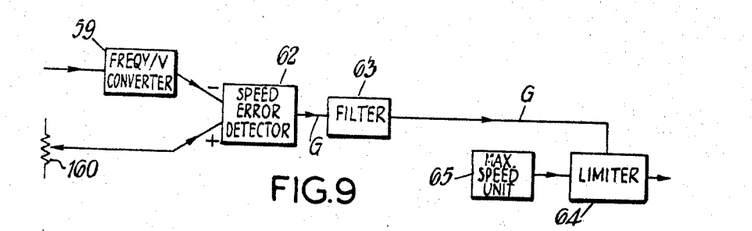

In a first modification of the arrangement of FIGURE 1, the pilot's or operator's control lever 60 is not provided, and it and the transducer 61 are replaced by a constant-voltage generating circuit. This modification is illustrated by FIGURE 9, wherein the constant-voltage circuit is indicated as a potentiometer 160. The constant-voltage circuit is pre-set to give a direct output voltage of an amplitude which represents the demanded final speed of the free turbine 12, and this output voltage is supplied to the control circuit at all times, even during starting of the engine (the control circuit of FIGURE 1 automatically acting to ensure that the engine is never accelerated too quickly). This arrangement may be employed, for example, where the gas-turbine engine is arranged to drive an electrical generator.

In a second modification of the arrangement of FIGURE 1, the following circuit elements are omitted; the speed sensor 22, the control lever 60, the transducer 61, the speed error detector 62, and the filter 63. In this modification, illustrated by FIGURE 10, the signal G is provided by the output of a voltage-generating circuit (represented in FIGURE 10 as a potentiometer 200), the amplitude of the signal G representing a demanded compressor-turbine speed.

Figure 10:
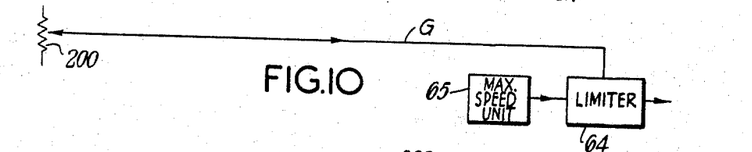

The arrangement of FIGURE 10 may be used, firstly, where the two-shaft gas-turbine engine of FIGURE 1 is arranged to drive certain forms of loads (e.g., a pneumatic compressor or a hydraulic pump) which are such that, as the speed of the free turbine 12 is increased, the power absorbed by the load increase more rapidly than does that speed.

The arrangement of FIGURE 10 may also be used, secondly, where a separate control system (not shown in the drawings) is provided, to control the load upon the free turbine 12 according to the actual speed of the free turbine, in the sense to tend to maintain the actual speed of the free turbine within predetermined safe limits. An example of such an application, is where the gas-turbine engine forms part of a direct-current traction system.

Finally, the arrangement of FIGURE 10 may be used in cases where the gas-turbine engine is of the single-shaft type, i.e. where the free turbine 12 is not present and the load is directly driven by the compressor turbine 9, the speed of the compressor turbine 9 then being controlled according to the amplitude of the signal G. In such case, the load sensor L (if provided) will be arranged to respond to the load upon the compressor turbine 9. In this case, if the load upon the compressor turbine 9 becomes excessively large, then the jet-pipe temperature will tend to exceed its datum value, whereupon the control unit 96 will operate to generate the signal W which will tend to decrease the compressor-turbine speed to a safe operating value.

Figure 11:
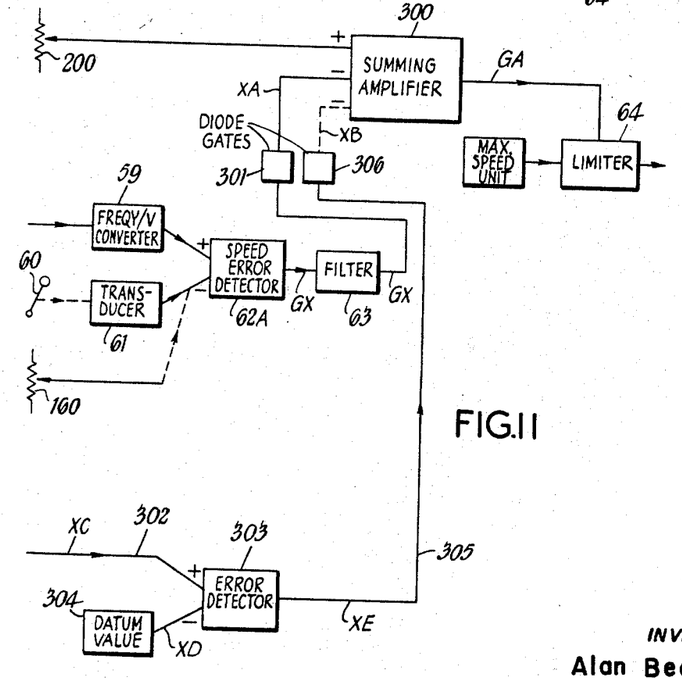

A third possible modification of the circuit of FIGURE 1 is illustrated by FIGURE 11, and is somewhat similar to arrangement of FIGURE 10.

Thus, in FIGURE 11, a voltage-generating circuit (represented as the potentiometer 200) generates the direct voltage G of which the amplitude represents a demanded compressor-turbine speed. This voltage G is supplied to one input of a summing amplifier 300 from which the signal G normally emerges unmodified, to form a signal GA which is supplied to the limiter 64 and thereafter acts as described with reference to FIGURE 1.

However, the summing amplifier 300 is capable of reducing the signal GA, to reduce the demanded compressor-turbine speed, by subtraction of signals such as XA and XB from the signal G, if a critical operating parameter of the gas-turbine engine, or a critical operating parameter associated with the operation of the engine and a load driven by the engine, exceeds a predetermined value.

Thus, for example, the signal XA can be caused to be present, if the actual free-turbine speed exceeds the demanded free-turbine speed. In order to generate the signal XA, a unit similar to the free-turbine controller unit 126 of FIGURE 1 is provided in the circuit of FIGURE 11, and comprises the frequency-to-voltage converter 59 (supplied as before, from the speed sensor 22), the control lever 60, the transducer 61, a speed error detector 62A identical to the detector 62 (FIGURE 1) but arranged to give an output speed-error signal GX of relatively opposite polarity to the error signal G of FIGURE 1, and the filter 63. The speed-error signal GX is supplied to a diode gate 301 and thence may pass to the summing amplifier 300.

In a modification, the control lever 60 and the transducer 61 may be replaced by the constant-voltage generator 160 described with reference to FIGURE 9.

In FIGURE 11, the speed-error signal GX will be of negative polarity when the demanded free-turbine speed exceeds the actual free-turbine speed and will not be passed by the diode gate 301; the output of the diode gate 301 (the signal XA) will then be zero. If, however, the actual free-turbine speed exceeds the demanded free-turbine speed, then the signal GX will be of positive polarity and will be passed by the diode gate 301, to constitute the signal XA. The effect of the signal XA will be to tend to reduce the demanded compressor-turbine speed.

When the signal XA is present, the cirucit of FIGURE 11 will operate substantially identically with the circuit of FIGURE 1.

The signal GA may also be reduced, by subtracting a signal XB from the signal G, if any other operating parameter of, or associated with, the engine exceeds a datum value. Thus referring to FIGURE 11, a direct voltage XC, of amplitude proportional to the actual value of the operating parameter concerned, is supplied (along a line 302) to one input of an error detector 303. An electrical circuit 304 is provided, to generate a direct voltage XD of amplitude proportional to the datum value of the parameter concerned, the voltage XD being supplied to the other input of the error detector 303. The error detector acts to subtract the signal XD from the signal XC, to generate an error signal XE which is supplied, over a line 305, to a diode gate 306, whence the signal may pass to the summing amplifier 300.

If the actual value of the operating parameter concerned is less than the datum value, then the error signal XE will be of negative polarity and will not be passed by the diode gate 306; the output of the diode gate 306 (the signal XB) will then be zero. If, however, the actual value of the operating parameter concerned exceeds the datum value, then the error signal XE will be of positive polarity and will be passed by the diode gate 306, to constitute the signal XB. The effect of the signal XB will be to tend to reduce the demanded compressor-turbine speed.

Referring to FIGURE 11, modifying signals of the form of the signals XA and XB are generated when other operating parameters of the engine, or of the engine and a load driven by the engine, exceed datum values. The signals XA and XB also tend to reduce the demanded compressor-turbine speed, but are characterised in that, firstly, they are generated when the engine is delivering too much power. Secondly, when the signals XA and XB cease, the consequent increased amplitude of the signal GA may represent an excessively high demanded compressor-turbine speed, so that the signal GA is required to be capable of being reduced by the action of the limiter 64, the comparator limiter 66 and the signals V and W; for this reason, the signals XA and XB must be introduced ahead of the limiters 64 and 66 and the summing amplifier 70.

The following are examples of cases where the signal XB may be employed, to reduce the demanded compressor-turbine speed:

(i) Where the free turbine 12 drives an electrical generator, the signal XC (FIGURE 11) may be a function of the output current of the generator, when the datum signal XD may represent a maximum allowable value of that output current; in this case, the signal XB will appear, if the output current exceeds that datum value;

(ii) Where the free turbine 12 drives a mechanical load other than substantially directly, for example where the free turbine drives an electrical generator which drives an electric motor which, in turn, drives a load, or where the free turbine drives a hydraulic pump which drives a hydraulic motor which, in turn, drives a load: in such cases, the signal XC may represent the speed of the load shaft, and the datum signal XD may represent a maximum allowable value of that speed, so that the signal XB will appear, if overspeeding of the load shaft occurs;

(iii) Where the free turbine 12 drives a load which may become excessively hot, the signal XC may represent the temperature of that load, and the datum signal XD may represent a maximum allowable value of that temperature, so that the signal XB will appear, if the load becomes excessively hot.

*Modification 3.—Limit-cycling control*

As described in this specification, the overall control circuit of FIGURE 1 has been assumed to be an ordinary continuous-control circuit. However, if required, the overall control circuit of FIGURE 1 may be converted to a limit-cycling control circuit; essentially, a limit-cycling control circuit contains a circuit element or circuit elements with non-linear transfer functions: the control-circuit loop is operated with a high loop gain, and the non-linearities result in the amplification of oscillations within the control loop. In the case of the circuit of FIGURE 1, the necessary non-linearity may be provided by the motor 36. Such limit-cycling control will have particular advantages in the case where, during acceleration of the engine, the acceleration is being limited by the signals V and W, and the signal V, as well as the signal W, is a function of the jet-pipe temperature.

I claim:

1. An electrical control system for an engine having a rotatable part and a throttle for controlling the fuel supply to the engine, the control system comprising means for deriving a demand signal which represents a demanded speed of the rotatable part, a modifying circuit including first modifying means for deriving at least one modifying signal as a function of the excess amount by which the value of at least one operating parameter of the engine exceeds a datum value for that parameter, the modifying circuit being arranged to combine the demand signal and the first modifying signal to modify the demand signal in the sense to reduce the excess amount, and to derive a periodic control signal the frequency of which represents the allowable demanded speed of the rotatable part, means for deriving a periodic speed signal the frequency of which represents the actual speed of the rotatable part, a frequency comparison device arranged to receive the control signal and the speed signal and to derive an error signal representing the difference between frequencies of the control signal and the speed signal, and drive means responsive to the error signal to tend to change the fuel supply to the engine in the sense to reduce the error signal.

2. An electrical control system according to claim 1 in which the frequency comparison device is arranged to derive the error signal in the form of a set of mutually phase-displaced periodic electric signals of which the frequency is a function of the difference between the frequencies of the control and speed signals and in which the sense of the mutually phase-displaced periodic electric signals represents the sense of that difference.

3. A control system according to claim 2 in which the drive means is an electric motor of the synchronous type having its armature energised by the said set of periodic electric signals and so arranged that its rotor rotates at a speed which is a function of the integral of the error signal.

4. A control system according to claim 1 in which the modifying circuit also includes second modifying means arranged to limit the demand signal, before it is combined with the first modifying signal, to a form which represents a demanded speed of the rotatable part which does not exceed the actual speed of the rotatable part by more than a predetermined amount.

5. A control system according to claim 1 wherein said one operating parameter over at least a part of the speed range of said rotatable part is the magnitude of the opening of the throttle.

6. A control system according to claim 1, wherein the datum value for said one parameter is derived as a function of the actual speed of the engine.

7. A control system according to claim 6, wherein said one operating parameter over at least a part of the speed range of said rotatable part is a function of engine temperature.

8. A control system according to claim 1, wherein the first modifying means is so arranged that, for a range of lower speeds of the rotatable part, the said operating parameter is the opening of the said throttle valve, while, for a range of higher speeds of the rotatable part, the said operating parameter is the said function of the engine temperature.

9. A control system according to claim 1, wherein the said operating parameter or at least one of the operating parameters is the acceleration of the rotatable part, and the datum value of that parameter is determined as a function of the actual speed of the rotatable part.

10. A control system according to claim 1, wherein the means for deriving the demand signal includes generating means which is pre-set to provide the demand signal in a form representing the ultimate speed which the rotatable part is required to attain.

11. A control system according to claim 1 in which the engine is coupled to a member to be driven, wherein the means for deriving the demand signal comprises means for deriving an initial signal which represents an ultimate speed of the rotatable part, the control system including a further modifying circuit normally operative to derive the demand signal merely as a function of the initial signal, the further modifying circuit including further modifying means for deriving at least one further modifying signal as a function of the excess amount by which the value of at least one further operating parameter associated with the member to be driven exceeds a datum value of that parameter, and the further modifying circuit being arranged to combine the initial signal and the further modifying signal so as to modify the demand signal in the sense to tend to reduce that excess amount.

12. A control system according to claim 11 wherein the engine is connected to drive an electrical generator, and the said further operating parameter is a function of the output current of the electrical generator.

13. A control system according to claim 11 wherein the engine is connected to drive a mechanical load indirectly, other than by a substantially direct coupling, and the said further operating parameter is the speed at which the load is driven.

14. A control system according to claim 11 wherein the engine is connected to drive a load, and the said further operating parameter is the temperature of the load and is operable to maintain the load temperature below a pre-determined safe operating value.

15. A control system according to claim 1 including limiting means which is operable to limit the magnitude of the error signal when the error signal tends to increase the fuel supply and accelerate the engine and which is inoperable when the error signal tends to reduce to the fuel supply and decelerate the engine.

16. A control system according to claim 1 wherein the engine is a gas-turbine engine and the rotatable part is constituted by the compressor turbine of the engine.

17. A control system according to claim 16 wherein at least one of the operating parameters is a function of the difference between a function of the exhaust temperature of the engine and a function of the actual speed of the compressor turbine, and the datum value of that parameter is derived as a function of the temperature of the air at the inlet of the engine and of the actual speed of the compressor turbine.

18. A control system according to claim 16, wherein the engine includes a free turbine, the control system including means for deriving the demand signal as a function of the difference between the actual and demanded speeds of the free turbine.

19. An electrical control system for a gas turbine engine having a compressor turbine and a free turbine arranged to drive a load and a throttle for controlling the fuel supply to the engine, the system comprising first means operable to derive a first repetitive signal having a frequency which is a function of the compressor turbine speed, second means operable to derive a second repetitive signal having a frequency which is a function of the free turbine speed modified as a function of demanded free turbine speed, throttle position, rate of change of throttle position and engine temperature as related to compressor turbine speed, means for deriving an error signal as a function of the frequency difference between said first and second signals and means responsive to said error signal to modify said throttle position in the sense to reduce said error signal.

20. An electrical control system for an engine having a rotatable part and a throttle for controlling the fuel supply to the engine, the control system comprising means for deriving a demand signal the amplitude of which represents the demanded speed of the rotatable part, means for deriving datum signals having amplitudes which are datum functions of engine temperature and throttle opening, means for applying the datum signals to modify the demand signal to ensure that the datum functions are not exceeded, the modified demand signal having an amplitude which represents an allowable speed of the rotatable part, a voltage controlled oscillator supplied with the modified demand signal and arranged to derive a periodic control signal having a frequency which represents the allowable demanded speed of the rotatable part, means for deriving a periodic actual speed signal having a frequency which represents the actual speed of the rotatable part, a frequency comparison device arranged to receive the control signal and the actual speed signal and to produce a periodic error signal having a frequency which represents the difference between the frequencies of the control signal and the actual speed signal and a synchronous motor having a rotor, the motor being arranged to receive the error signal so that its rotor rotates at a speed which is a function of the integral of the error signal, the rotor being arranged to control the throttle for the fuel supply.

References Cited

UNITED STATES PATENTS

| 3,301,269 | 1/1967 | Marwood | 60—39.28 X |
| 3,302,398 | 2/1967 | Taplin et al. | 60—39.28 |
| 3,098,356 | 7/1963 | Joline | 60—39.28 |
| 3,164,769 | 1/1965 | Anderson. | |
| 2,648,194 | 8/1953 | Jorgensen et al. | 60—39.28 |
| 3,151,450 | 10/1964 | Blackaby | 60—39.28 XR |
| 3,174,284 | 3/1965 | McCarthy | 60—39.28 XR |

JULIUS E. WEST, *Primary Examiner.*